United States Patent
Iwahori

(10) Patent No.: US 12,365,409 B2
(45) Date of Patent: Jul. 22, 2025

(54) STATE SWITCHING DEVICE, MOVING OBJECT, AND MANUFACTURING METHOD OF MOVING OBJECT

(71) Applicant: TOYOTA JIDOSHA KABUSHIKI KAISHA, Toyota (JP)

(72) Inventor: Kento Iwahori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/781,636

(22) Filed: Jul. 23, 2024

(65) Prior Publication Data

US 2025/0083761 A1 Mar. 13, 2025

(30) Foreign Application Priority Data

Sep. 8, 2023 (JP) .................. 2023-145710

(51) Int. Cl.
*B62D 65/18* (2006.01)
(52) U.S. Cl.
CPC ................... *B62D 65/18* (2013.01)
(58) Field of Classification Search
CPC ..................................... B62D 65/18
See application file for complete search history.

(56) References Cited

U.S. PATENT DOCUMENTS

| | | |
|---|---|---|
| 2017/0320529 A1 | 11/2017 | Nordbruch |
| 2020/0156722 A1 | 5/2020 | Watkins et al. |
| 2022/0080955 A1* | 3/2022 | Diamond ............. G05D 1/0212 |
| 2023/0073436 A1* | 3/2023 | Kent ..................... H04W 4/029 |
| 2024/0012394 A1* | 1/2024 | Oh ........................ G06T 7/0004 |

FOREIGN PATENT DOCUMENTS

JP 2017-538619 A 12/2017

* cited by examiner

*Primary Examiner* — Yuhui R Pan
(74) *Attorney, Agent, or Firm* — Oliff PLC

(57) ABSTRACT

A state switching device includes: a progress status acquisition unit that acquires a progress status of processing performed on a moving object in a manufacturing process of the moving object in a factory for manufacturing the moving object movable by unmanned driving, the moving object including at least one device; a device determination unit that determines a device to be switched to an actuation state, the determined device being included in the at least one device and being set to a standby state before the processing is performed, by using the acquired progress status; and a command generation unit that generates a control command for switching the determined device to the actuation state and outputs the control command.

5 Claims, 9 Drawing Sheets

Fig.5B

| | AT START TIME OF INSPECTION | ENGINE ROOM INSPECTION | APPEARANCE INSPECTION | ... | AT COMPLETION TIME OF INSPECTION |
|---|---|---|---|---|---|
| | | PROGRESS STATUS OF PROCESSING | | | |
| COMMUNICATION DEVICE | POWER-OFF STATE | →ACTUATION STATE | ACTUATION STATE | ... | ACTUATION STATE |
| ECU | POWER-OFF STATE | →ACTUATION STATE | ACTUATION STATE | | ACTUATION STATE |
| MOTOR | POWER-OFF STATE | POWER-OFF STATE | →ACTUATION STATE | | ACTUATION STATE |
| TRANSMISSION UNIT | POWER-OFF STATE | POWER-OFF STATE | →REGULATION STATE | ... | →ACTUATION STATE |
| EPB | POWER-OFF STATE | POWER-OFF STATE | →REGULATION STATE | | →ACTUATION STATE |
| ACCELERATOR | POWER-OFF STATE | POWER-OFF STATE | →REGULATION STATE | | →ACTUATION STATE |
| STEERING WHEEL | POWER-OFF STATE | POWER-OFF STATE | →REGULATION STATE | | →ACTUATION STATE |
| ... | | | ... | | ... |

TB

STATE SWITCHING DEVICE, MOVING OBJECT, AND MANUFACTURING METHOD OF MOVING OBJECT

CROSS REFERENCE TO RELATED APPLICATIONS

The present application claims the benefit of priority to Japanese Patent Application No. 2023-145710 filed on Sep. 8, 2023, the entire contents of which are incorporated herein by reference herein.

BACKGROUND

Field

The present disclosure relates to a state switching device, a moving object, and a manufacturing method of the moving object.

Related Art

In a manufacturing system for manufacturing a vehicle, a technology of using both conveyance methods of conveyance of a vehicle using a belt and conveyance using vehicle running by remote control is known. For example, Japanese Translation of PCT International Application Publication No. 2017-538619 discloses a technology in which a manufacturing process is performed during conveyance of a vehicle using a belt, and when the manufacturing process ends, the vehicle is caused to run to a parking by remote control.

In a manufacturing process of a vehicle, as preparation for starting running by remote control, on/off of power of a device provided in a vehicle or a function of such a device is switched in some cases. However, when the preparation for starting vehicle running is not performed at an appropriate timing with respect to a progress status of the manufacturing process, the start timing of the vehicle running may be delayed with respect to the progress status of the manufacturing process.

SUMMARY

The present disclosure can be achieved as aspects as below.

(1) According to an aspect of the present disclosure, a state switching device is provided. This state switching device includes: a progress status acquisition unit that acquires a progress status of processing performed on a moving object in a manufacturing process of the moving object in a factory for manufacturing the moving object movable by unmanned driving, the moving object including at least one device; a device determination unit that determines a device to be switched to an actuation state, the determined device being included in the at least one device and being set to a standby state before the processing is performed, by using the acquired progress status; and a command generation unit that generates a control command for switching the determined device to the actuation state and outputs the control command.

According to the state switching device of this aspect, devices are sequentially switched to the actuation state on the basis of the progress status of the processing in the manufacturing process. Therefore, as compared to a case where all devices are switched to the actuation state in one time at the time of the completion of the processing, the delay in starting moving of the moving object is suppressed or prevented with respect to the completion of the processing.

(2) In the state switching device of the aspect described above, the progress status acquisition unit may acquire, as the progress status, a predetermined activation timing before a completion timing at which all of the processing is completed. The device determination unit may determine, as the device to be switched to the actuation state, each of all devices for moving the moving object among devices being set to the standby state before the processing is performed, by using the acquired activation timing.

According to the state switching device of this aspect, all devices can be set to the actuation state before the timing at which all processing is completed, and it is possible to more reliably suppress or prevent the delay in starting moving of the moving object with respect to the completion of the processing.

(3) In the state switching device of the aspect described above, the processing may be performed during conveyance of the moving object by a conveyance device capable of conveying the moving object.

According to the state switching device of this aspect, conveyance and processing can be performed in parallel to each other even in a state where the moving object cannot move such as a state where the power of the device of the moving object is turned off.

(4) In the state switching device of the aspect described above, the progress status acquisition unit may acquire a conveyance position of the moving object associated with the progress status and acquire the progress status by using the acquired conveyance position.

According to the state switching device of this aspect, the progress status of processing can be acquired by a simple method of acquiring the conveyance position of the moving object.

(5) In the state switching device of the aspect described above, the at least one device may include a prime mover of the moving object. The processing may include an inspection related to the prime mover in a state of being stopped as the standby state. The progress status acquisition unit may acquire, as the progress status, a timing at which the inspection related to the prime mover is completed. The device determination unit may determine, as the device to be switched to the actuation state, the prime mover by using the acquired timing of the inspection related to the prime mover. The command generation unit may generate a control command for actuating the prime mover and transmit the control command to the moving object.

According to the state switching device of this aspect, it is possible to prevent the prime mover from being in the actuation state at the time of the inspection related to the prime mover and suppress or prevent a decrease in productivity of the inspection related to the prime mover.

(6) In the state switching device of the aspect described above, the standby state may include a regulation state in which power of the device is on and at least some of functions for moving of the moving object in the device is regulated.

According to the state switching device of this aspect, by switching to the regulation state, switching to the actuation state can be made in a shorter time as compared to a case of switching from the standby state to the actuation state without going through the regulation state, so that it is possible to more reliably suppress or prevent the delay in starting moving of the moving object with respect to the completion of the processing.

(7) According to another aspect of the present disclosure, a moving object capable of moving by unmanned driving is provided. This moving object includes: at least one device; a progress status acquisition unit that acquires a progress status of processing performed on the moving object in a manufacturing process of the moving object; a device determination unit that determines a device to be switched to an actuation state, the determined device being included in the at least one device and being set to a standby state before the processing is performed, by using the acquired progress status; and a command generation unit that generates a control command for switching the determined device to the actuation state and outputs the control command.

According to the moving object of this aspect, the moving object is capable of sequentially switching devices to the actuation state independently, on the basis of the progress status of the processing in the manufacturing process. Therefore, as compared to a case where all devices are switched to the actuation state in one time at the time of completion of the processing, the start of moving of the moving object is suppressed or prevented from being delayed with respect to the completion of the processing.

The present disclosure can be achieved in various aspects other than the state switching device and the moving object. For example, the present disclosure can be achieved in aspects such as a state switching device, a conveyance device, a conveyance system, a manufacturing method of a moving object, a state switching method of a moving object, a conveyance method of a moving object, a control method of a moving object, a control method of a conveyance device, a control method of a conveyance system, a computer program for achieving these control methods, and a non-transitory recording medium in which the computer program is recorded.

DETAILED DESCRIPTION

A. First Embodiment

Figure 1:
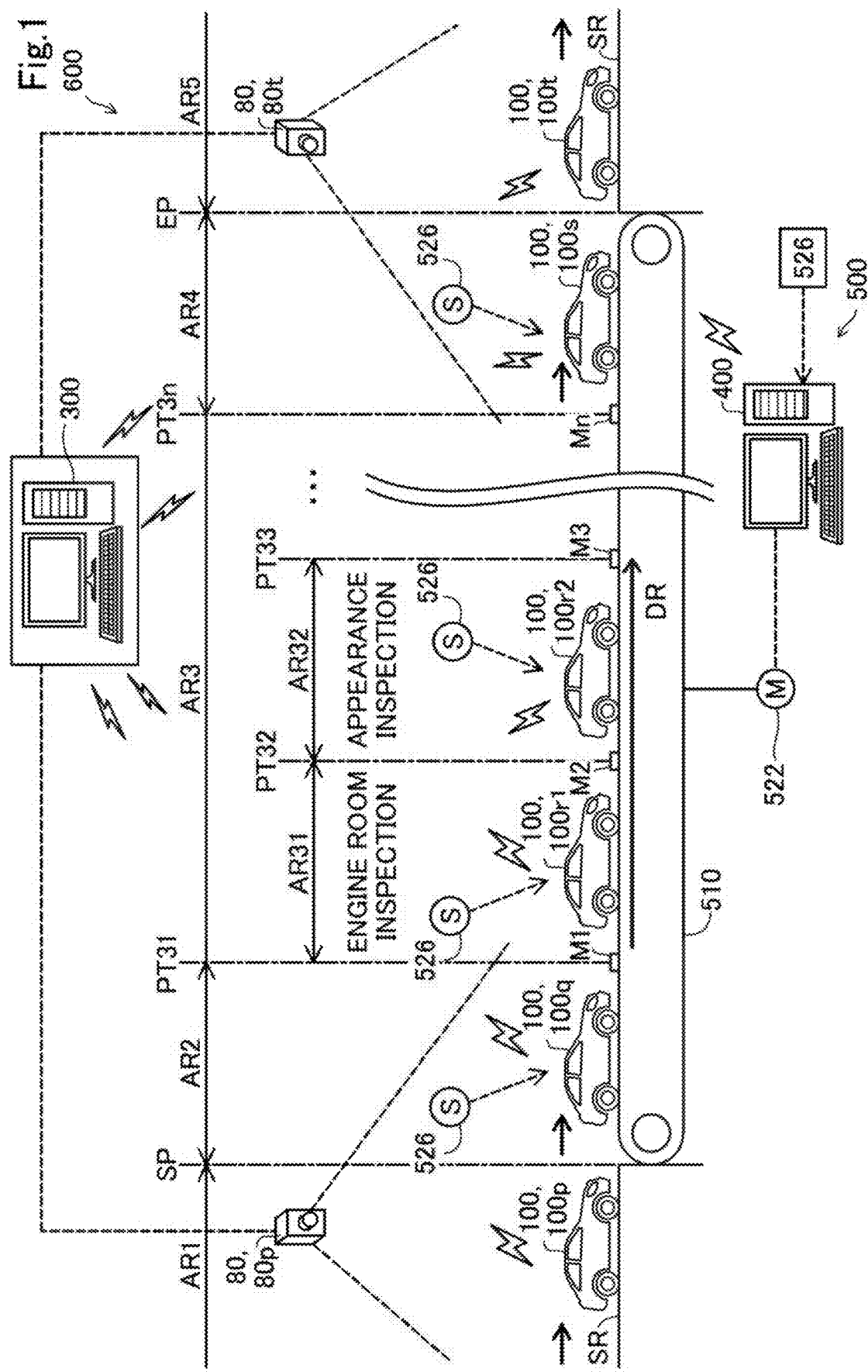
FIG. 1 is an explanatory diagram illustrating a configuration of a conveyance system including a remote control device as a state switching device.

FIG. 1 is an explanatory diagram illustrating a schematic configuration of a conveyance system 600 including a remote control device 300 as a state switching device according to a first embodiment of the present disclosure. The conveyance system 600 is used in, for example, a factory for manufacturing a vehicle 100. A conveyance target of the conveyance system 600 is the vehicle 100 capable of running by remote control. The conveyance system 600 is used in, for example, a manufacturing process of the vehicle 100 such as an inspection process or an assembly process of the vehicle 100, and conveys the vehicle 100 through a predetermined conveyance section in the manufacturing process. In the present embodiment, processing such as an inspection by an operator, equipment or the like is performed on the vehicle 100 being conveyed by a conveyance device 500.

Figure 2:
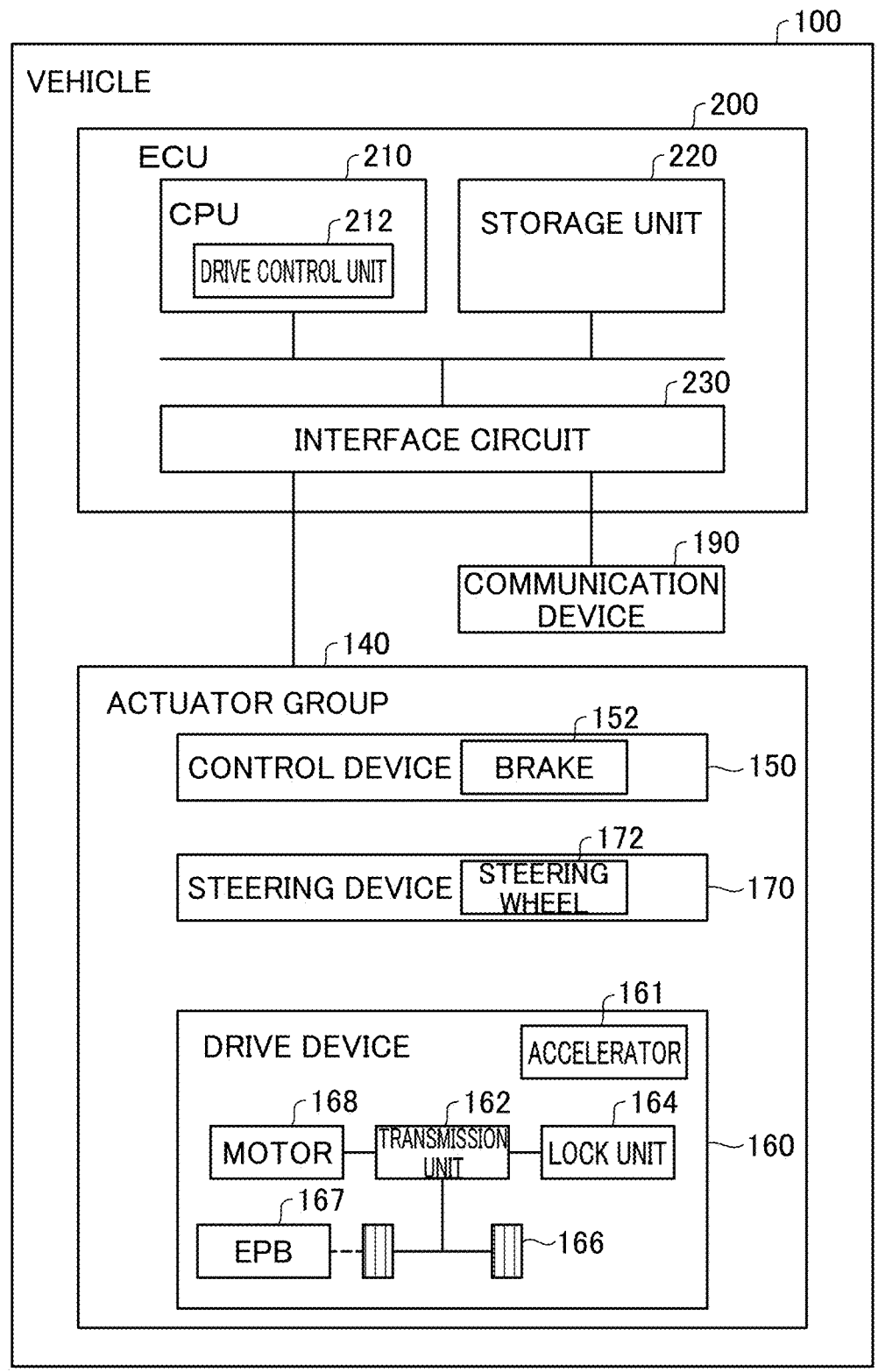
FIG. 2 is an explanatory diagram illustrating an internal function configuration of a vehicle.

FIG. 2 is an explanatory diagram illustrating an internal function configuration of the vehicle 100. The vehicle 100 is, for example, an automobile, a truck, a bus, a construction vehicle, or the like. In the present embodiment, the vehicle 100 is a battery electric vehicle (BEV) capable of running by unmanned driving. The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving." In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

The ECU 200 performs various types of control of the vehicle 100. The ECU 200 is an example of the device included in the vehicle 100. The ECU 200 includes: a storage device 220 such as a hard disk drive (HDD), a solid state drive (SSD), an optical recording medium, or a semiconductor memory; a CPU 210 as a central processing unit; and an interface circuit 230. The CPU 210, the storage device 220, and the interface circuit 230 are connected via an internal bus so as to be communicable with each other. The interface circuit 230 is connected with the actuator group 140 and the vehicle communication device 190. The vehicle communication device 190 performs radio communication with a device outside the vehicle 100 connected to a network such as the remote control device 300, via an access point in a factory or the like.

The storage device 220 stores a computer program for achieving at least some of functions provided in the present embodiment. When the CPU 210 executes various computer programs stored in a memory, a function of a driving control unit 212 or the like is achieved.

The driving control unit 212 performs driving control of the vehicle 100. The "driving control" is, for example, various types of control for driving the actuator group 140 that exhibits functions of "running", "turning", and "stopping" of the vehicle 100 such as adjustment of acceleration, speed, and steering angle. When a driver is present in the vehicle 100, the driving control unit 212 can cause the vehicle 100 to run by controlling the actuator group 140 according to operation by the driver. The driving control unit 212 can cause the vehicle 100 to run by controlling the actuator group 140 according a control command transmitted from the remote control device 300 irrespectively of whether a driver is present in the vehicle 100.

In the present embodiment, the actuator group 140 includes: an actuator of a breaking device 150 for decelerating the vehicle 100; an actuator of a drive device 160 for accelerating the vehicle 100; and an actuator of a steering device 170 for changing a travel direction of the vehicle 100. Each actuator included in the actuator group 140 is an example of the device included in the vehicle 100. The actuator group 140 may include an actuator for swinging a wiper of the vehicle 100 and an actuator for opening and closing a power window of the vehicle 100.

The actuator of the breaking device 150 includes, for example, various mechanisms such as a disk brake or a drum brake, and a brake pedal 152 operated by a driver. The actuator of the steering device 170 includes, for example, a steering wheel 172 for steering by a driver.

The actuator of the drive device 160 includes a battery for running (not illustrated), a motor for running 168 driven by power of the battery for running, a wheel 166, an EPB 167, a gas pedal 161 for adjusting output of the motor for running 168 by a driver, a transmission unit 162, and a lock unit 164. The motor for running 168 is an example of a prime mover. The wheel 166 rotates by power transmitted from the motor for running 168. The prime mover of another type such as an internal combustion engine or an external combustion engine may be provided instead of the motor for running 168.

The transmission unit 162 includes a transmission mechanism such as a gear and a shaft body and transmits power from the motor for running 168 to the wheel 166. The lock unit 164 switches between a fixation state in which the transmission mechanism of the transmission unit 162 is locked and a non-fixation state in which the lock is released. The lock unit 164 is also referred to as "parking lock pole". When the function of the transmission unit 162 is switched to a "P range" by remote control of the remote control device 300 or manual operation or the like of a driver of the vehicle 100, the lock unit 164 is switched to the fixation state and rotation of the wheel 166 is blocked. When the function is switched to an "N range", the gear or the like in the transmission mechanism of the transmission unit 162 is in a non-connected state, and the power from the motor for running 168 is not transmitted to the wheel 166 anymore. In the N range, the wheel 166 is in a spinning free state. The "spinning free state" means a state in which the wheel 166 is capable of spinning. At the time of spinning, the vehicle 100 cannot travel a distance corresponding to a rotation amount of the wheel 166 even when the wheel 166 rotates. When the function is switched to a "D range", the state is switched to a state in which the lock unit 164 is in the non-fixation state and the gear or the like of the transmission mechanism of the transmission unit 162 is in a connected state. In the state of the D range, power from the motor for running 168 is transmitted to the wheel 166 by the transmission unit 162 and the vehicle 100 can run.

The EPB 167 is an electric parking brake (EPB) operable by remote control or manual operation of a driver. The EPB 167 is also referred to as an emergency brake. In general, in the state of the P range and the N range, the EPB 167 is in a stop state of stopping the vehicle 100, and, in the state of the D range, the EPB 167 is in a non-stop state in which the vehicle 100 can run.

As illustrated in FIG. 1, the conveyance system 600 includes a vehicle detector 80, a conveyance device 500, and a remote control device 300. The remote control device 300 generates a control command for causing the vehicle 100 to perform automatic running by remote control and transmits the control command to the vehicle 100, and performs driving control of the vehicle 100 by remote control. The remote control device 300 performs conveyance or the like of the vehicle 100 in the conveyance section in the factory by causing the vehicle 100 to perform automatic running by remote control, for example. In the present embodiment, as described later, the remote control device 300 also functions as a state switching device that switches at least one device included in the vehicle 100 from the standby state to the actuation state on the basis of the progress status of the processing.

FIG. 1 illustrates vehicle detectors 80*p*, 80*t* as an example of the vehicle detector 80. The vehicle detector 80 is a device for measuring vehicle information. The "vehicle information" is, for example, information used for estimating at least one of a position of the vehicle 100 and orientation of the vehicle 100, such as an image of the vehicle 100 or three-dimensional point cloud data of the vehicle 100. The "three-dimensional point cloud data" is data indicating a three-dimensional position of a point cloud. The vehicle detector 80 in the present embodiment corresponds to an external sensor. The external sensor is a sensor located outside the vehicle 100. The vehicle information corresponds to a detection result output from the external sensor. In the present embodiment, a light detection and ranging (LiDAR) which is a distance measurement device is used as the vehicle detector 80. The vehicle detector 80 measures three-dimensional point cloud data of the vehicle 100 as the vehicle information. By using the LiDAR, highly accurate three-dimensional point cloud data may be acquired.

The vehicle detector 80 is communicably connected with the remote control device 300 with radio communication or wired communication. The remote control device 300 can acquire, in real time, the relative position and orientation of the vehicle 100 with respect to a target route in which the vehicle 100 is to run by acquiring vehicle information from the vehicle detector 80. The position of the vehicle detector 80 is fixed to a track SR and the vicinity of the conveyance device 500. The target route in the present embodiment corresponds to a reference path described later.

The conveyance device 500 includes a motor 522, a conveyance unit 510, a plurality of conveyance position detectors 526, and a conveyance control device 400. The motor 522 is controlled by the conveyance control device 400 and drives the conveyance unit 510.

The conveyance unit 510 conveys the vehicle 100 as a conveyance target in a conveyance direction DR. In the present embodiment, the conveyance unit 510 is a belt conveyor including a ring-shaped endless belt and conveys the vehicle 100 in a state of being grounded on the endless belt. The conveyance unit 510 enables the vehicle 100 to move through a predetermined conveyance section without remote control, driving control of the vehicle 100, or the like. The vehicle 100 on the conveyance unit 510 can leave the conveyance unit 510 at any timing by remote control of the remote control device 300. In the present embodiment, the conveyance unit 510 is continuously driven irrespectively of whether the vehicle 100 is present on the conveyance unit 510. However, the conveyance unit 510 is not limited to a case of being continuously driven and may be configured to drive only in a state where the vehicle 100 is placed on the conveyance unit 510. The conveyance unit 510 may convey not only the vehicle 100 but also an operator who performs processing on the vehicle 100 and components of the vehicle 100, for example, together with the vehicle 100. The conveyance unit 510 is not limited to a belt conveyor, and may be various conveyors capable of conveying the vehicle 100, such as a roller conveyor or a chain conveyor.

The conveyance position detector 526 is a detector of various types such as an infrared sensor, an ultrasonic sensor, and a millimeter wave radar, capable of detecting presence or absence of a target. The conveyance position detector 526 detects the vehicle 100 on the conveyance unit 510. In the present embodiment, the conveyance device 500 includes a plurality of conveyance position detectors 526. A plurality of progress status acquisition units 318 are set for each predetermined conveyance section in the conveyance device 500. As a result, presence or absence of the vehicle 100 for each conveyance section, that is, a position (hereinafter, also referred to as a "conveyance position") of the vehicle 100 during conveyance by the conveyance device 500 can be detected. The detection result by the conveyance position detector 526 is output to the conveyance control device 400.

Figure 3:
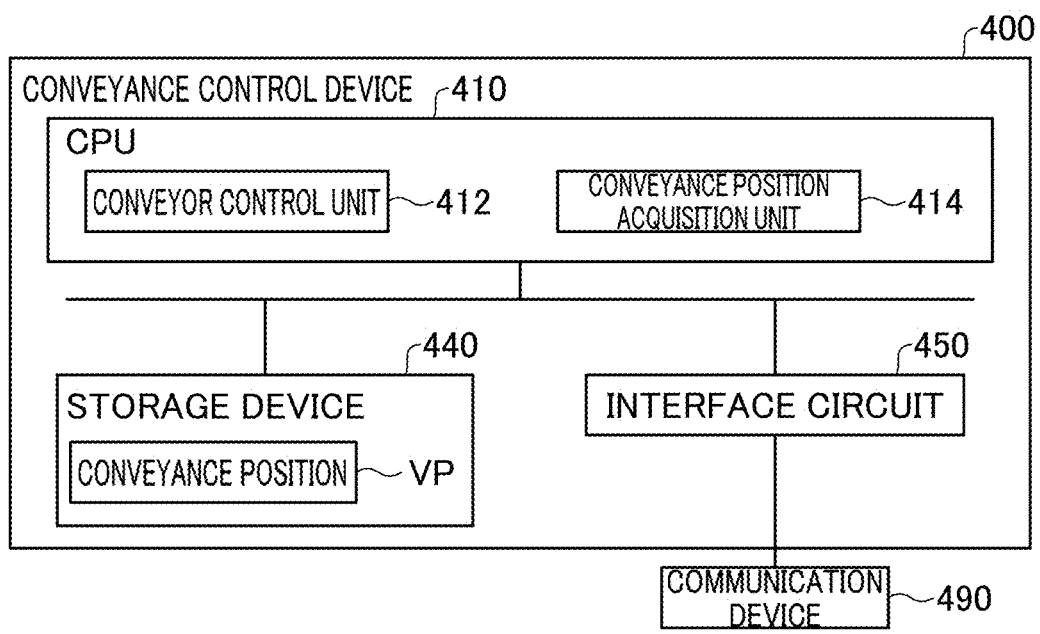
FIG. 3 is a block diagram illustrating an internal function configuration of a conveyance control device.

FIG. 3 is a block diagram illustrating an internal function configuration of the conveyance control device 400. The conveyance control device 400 includes a CPU 410 as a central processing unit; a storage device 440; an interface circuit 450; and a conveyance communication device 490. The CPU 410, the storage device 440, and the interface circuit 450 are connected via an internal bus so as to be communicable with each other. The interface circuit 450 is connected with the conveyance communication device 490. The conveyance communication device 490 performs communication with the remote control device 300 and the vehicle 100 via a network or the like.

The storage device 440 is, for example, a RAM, a ROM, an HDD, an SSD, or the like. In a readable and writable region of the storage device 440, a conveyance position VP detected by the conveyance position detector 526 is stored. The storage device 440 stores a program for achieving at least some of functions provided in the present embodiment. When the CPU 410 executes the program, the CPU 410 functions as a conveyor control unit 412 and a conveyance position acquisition unit 414. The conveyor control unit 412 drives the motor 522 to control on/off and conveyance speed of the conveyance unit 510.

The conveyance position acquisition unit 414 acquires the conveyance position of the vehicle 100 in the conveyance section by the conveyance device 500 from the conveyance position detector 526, and stores the acquired conveyance position as the conveyance position VP in the storage device 440. The conveyance position acquisition unit 414 may acquire the position of the vehicle 100 in the conveyance section by using the vehicle detector 80. When the conveyance position of the vehicle 100 is detected through the entire conveyance section by the vehicle detector 80, the conveyance position detector 526 may not be provided.

The conveyance method of the vehicle 100 will be described with reference to FIG. 1. FIG. 1 schematically illustrates the conveyance section of the vehicle 100 from a range AR1 to a range AR5. FIG. 1 illustrates vehicles 100*p*, 100*q*, 100*r*, 100*r*2, 100*s*, 100*t* that are each an example of the vehicle 100, and vehicle detectors 80*p*, 80*t* that are each an example of the vehicle detector 80. The range AR1 and the range AR5 are conveyance sections using automatic running of the vehicle 100 by remote control. In the range AR1, the vehicle 100*p* performs automatic running to the conveyance device 500 by remote control using vehicle information acquired from the vehicle detector 80*p*. In the range AR5, the vehicle 100*t* that has left the conveyance device 500 runs to the next process or the like by remote control using vehicle information acquired from the vehicle detector 80*p*.

The section from the range AR2 to the range AR4 is a conveyance section of the vehicle 100 using the conveyance device 500. The range AR2 is an example of a conveyance start position at which the conveyance of the vehicle 100 by the conveyance device 500 starts. In the range AR2, the conveyance method of the vehicle 100 is switched from self-running conveyance by remote control to conveyance by the conveyance device 500. The vehicle 100*p* that runs by remote control travels over a start point SP in one end side of the conveyance unit 510 and enters the range AR2. The vehicle 100*q* that has reached the range AR2 is in a state of being able to be conveyed by the conveyance unit 510.

In the range AR3, the vehicle 100 is conveyed by the conveyance device 500, and predetermined processing performed on the vehicle 100 in the manufacturing process of the vehicle 100 is performed. In the present embodiment, in the range AR3, as an example of the processing, an inspection process of performing an inspection of each device included in the vehicle 100 is performed. Specifically, in a range AR31 in the AR3, inspection of the inside of a so-called engine room of the vehicle 100*r*1 is performed. In the inspection of the inside of the engine room, for example, an inspection of assembly or the like of the motor for running 168 and components around the motor for running 168 is performed. Therefore, it is preferable that, while the engine room inspection is performed, the motor for running 168 and components around the motor for running 168 be in a standby state such as in a state of being turned off. The engine room is also referred to as a bonnet or hood. In the range AR32, appearance inspection of the vehicle 100*r*2 is performed. Inspection of a scratch, dent, or the like of the vehicle body of the vehicle 100*r*2 is performed. In the range AR3, in addition to the inspection, processing such as an inspection and adjustment of lights and meters or oil leakage inspection may be performed. Each inspection may be an automatic inspection using a device or the like, or may be a manual inspection by an operator. At least a part of the actuator group 140 is set to a standby state by the time when the inspection process starts.

The range AR3 is a region outside a detection range of the vehicle 100 by the vehicle detector 80. In the range AR3, automatic running of the vehicle 100 by remote control is not performed. However, the vehicle 100 in the range AR3 can perform radio communication with the remote control device 300, and can perform remote control for switching the state of each device of the vehicle 100 such as switching between the standby state and the actuation state of the vehicle 100 or each device. However, by setting the range AR3 in the detection range of the vehicle detector 80, automatic running of the vehicle 100 by remote control may be performed also in the range AR3.

The range AR4 is an example of a conveyance end position at which the conveyance of the vehicle 100 by the conveyance device 500 ends. The vehicle 100 reaches the range AR4 after the inspection in the range AR3 is completed. In the range AR4, the vehicle detector 80*t* can detect the vehicle 100s, and the vehicle 100s can be caused to leave the conveyance unit 510 by causing the vehicle 100s to perform automatic running by remote control. In the present embodiment, the range AR4 is preset as a range from an end point EP in the other end side of the conveyance unit 510 to a predetermined distance. This "predetermined distance" is determined on the basis of a range in which the vehicle detector 80t can detect the vehicle 100t, for example. However, the range AR4 may be any range from a position at which the processing on the vehicle 100 is completed in the range AR3 to the end point EP, on the premise that the vehicle detector 80t can detect the vehicle 100t. In this case, the size of the range AR4 is variable according to a progress status of the processing on the vehicle 100 in the range AR3.

Figure 4:
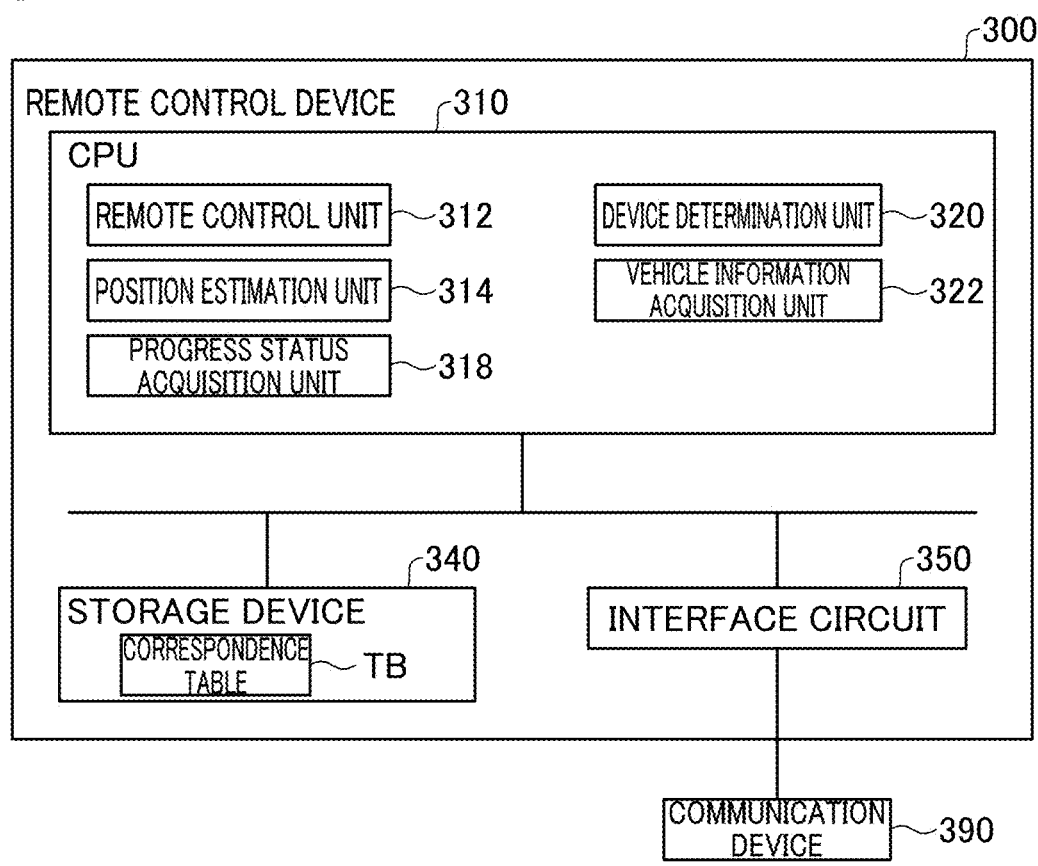
FIG. 4 is a block diagram illustrating an internal function configuration of a remote control device according to a first embodiment.

FIG. 4 is a block diagram illustrating an internal function configuration of the remote control device 300 according to the first embodiment. The remote control device 300 includes: a CPU 310 as a central processing unit; a storage device 340; an interface circuit 350; and a remote communication device 390. The CPU 310, the storage device 340, and the interface circuit 350 are connected via an internal bus so as to be communicable with each other. The interface circuit 350 is connected with the remote communication device 390. The remote communication device 390 performs communication with the vehicle 100 and the conveyance control device 400 via a network or the like.

The storage device 340 is, for example, a RAM, a ROM, an HDD, an SSD, or the like. In a readable and writable region of the storage device 340, a correspondence table TB is stored. The storage device 340 stores a computer program for achieving at least some of functions provided in the present embodiment. When the CPU 310 executes the computer program stored in the storage device 340, the CPU 310 functions as a remote control unit 312, a position estimation unit 314, a progress status acquisition unit 318, a device determination unit 320, and a vehicle information acquisition unit 322. However, some or all of these functions may be configured by a hardware circuit.

The vehicle information acquisition unit 322 acquires vehicle identification information of the vehicle 100 being a conveyance target of the conveyance device 500 from a production management device or the like. The "vehicle identification information" means various information capable of identifying individual vehicle 100. The vehicle identification information includes, for example, ID information given to each vehicle 100 such as a vehicle identification number (VIN), and a manufacturing number of the vehicle 100 used in production management. The vehicle identification information is used to check whether the vehicle 100 is the conveyance target by the conveyance device 500. The vehicle identification information can be acquired via near field communication or the like from a radio frequency-identification (RF-ID) tag attached to the vehicle 100, for example. The vehicle identification information may be acquired by reading a two-dimensional code attached to the vehicle 100 by a camera or the like.

The position estimation unit 314 acquires vehicle information from the vehicle detector 80 and estimates the position and orientation of the vehicle 100 by using the acquired vehicle information. The position and orientation estimated by the position estimation unit 314 correspond to the vehicle position information described later. In the present embodiment, the position estimation unit 314 uses, as the vehicle information, three-dimensional point cloud data measured by the vehicle detector 80. The position estimation unit 314 estimates the position and orientation of the vehicle 100 in the acquired three-dimensional point cloud data. Specifically, the position estimation unit 314 performs template matching on the three-dimensional point cloud data, by using the vehicle point cloud data stored in the storage device 340 in advance. Therefore, the position and orientation of the vehicle 100 in the three-dimensional point cloud data can be estimated with high accuracy. As the vehicle point cloud data as a template, for example, three-dimensional CAD data of the vehicle 100 can be used. The vehicle point cloud data includes information for specifying the orientation of the vehicle 100. In the template matching of the vehicle point cloud data with respect to the three-dimensional point cloud data, for example, an iterative closest point (ICP) algorithm, a normal distribution transform (NDT) algorithm, or the like can be used. In a case where the position of the vehicle 100 can be estimated with high accuracy from the three-dimensional point cloud data or other cases, template matching may not be performed.

The remote control unit 312 functions as a command generation unit that generates a control command for causing the vehicle 100 to perform various types of operation and outputs the control command to the vehicle 100. For example, the remote control unit 312 generates a control command for causing the vehicle 100 to perform automatic running by remote control and transmits the control command to the vehicle 100 by using the estimated position and orientation of the vehicle 100. This control command is, for example, a command for causing the vehicle 100 to run according to a target route stored in the storage device 340. The control command can be generated as a command including a drive force, a brake force, and a steering angle. When the vehicle 100 receives a request of remote control, the driving control is achieved by the driving control unit 212 of the ECU 200, and as a result, the vehicle 100 automatically runs. In the present embodiment, as described later, the remote control unit 312 also can generate a control command for switching the actuator group 140 corresponding to the progress status of the inspection process to the actuation state or the standby state according to the determination of the device determination unit 320.

Figure 5:
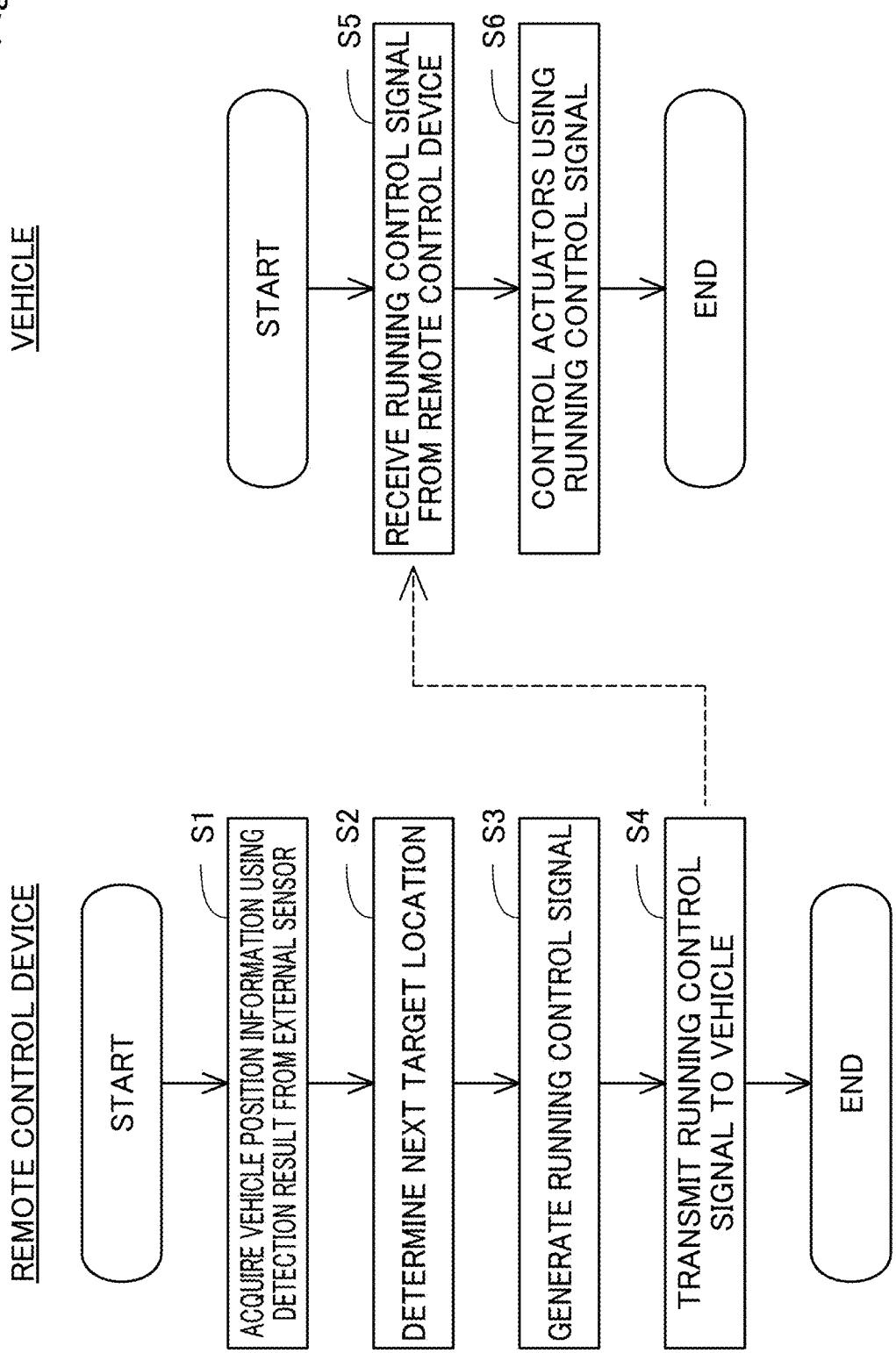
FIG. 5A is a flowchart illustrating a running method of a vehicle achieved by the remote control device.
FIG. 5B is an explanatory diagram illustrating an example of a correspondence table.

FIG. 5A is a flowchart showing a running method of the vehicle 100 achieved by the remote control device 300. In step S1, the remote control device 300 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory. In the present embodiment, the reference coordinate system of the factory is a global coordinate system and a location in the factory can be expressed by X, Y, and Z coordinates in the global coordinate system. Specifically, in the step S1, the remote control unit 312 acquires the results of estimation of the position and orientation of the vehicle 100 by the position estimation unit 314. In the present embodiment, the position of the vehicle 100 includes X, Y, Z coordinates in the global coordinate system of the factory. The position of the vehicle detector 80 is adjusted in advance. The remote control unit 312 detects the position of the vehicle 100 from the vehicle information acquired from the vehicle detector 80, and acquires the position of the vehicle 100 in the factory from the detected position of the vehicle 100.

In step S2, the remote control unit 312 determines a target location to which the vehicle 100 is to move next. In the present embodiment, the target location is expressed by X, Y, and Z coordinates in the global coordinate system. The storage device 340 of the remote control device 300 contains a reference route stored in advance as a route along which the vehicle 100 is to run. The route is expressed by a node indicating a departure place, a node indicating a way point, a node indicating a destination, and a link connecting nodes to each other. The remote control device 300 determines the target location to which the vehicle 100 is to move next using the vehicle location information and the reference route. The remote control device 300 determines the target location on the reference route ahead of a current location of the vehicle 100.

In step S3, the remote control unit 312 generates a running control signal for causing the vehicle 100 to run toward the determined target location. In the present embodiment, the running control signal includes an acceleration and a steering angle of the vehicle 100 as parameters. The remote control unit 312 calculates a running speed of the vehicle 100 from transition of the location of the vehicle 100 and makes comparison between the calculated running speed and a target speed of the vehicle 100 determined in advance. If the running speed is lower than the target speed, the remote control unit 312 generally determines an acceleration in such a manner as to accelerate the vehicle 100. If the running speed is higher than the target speed as, the remote control unit 312 generally determines an acceleration in such a manner as to decelerate the vehicle 100. If the vehicle 100 is on the reference route, remote control unit 312 determines a steering angle and an acceleration in such a manner as to prevent the vehicle 100 from deviating from the reference route. If the vehicle 100 is not on the reference route, in other words, if the vehicle 100 deviates from the reference route, the remote control unit 312 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the remote control unit 312 transmits the generated running control signal to the vehicle 100. The remote control unit 312 repeats the acquisition of vehicle location information, the determination of a target location, the generation of a running control signal, the transmission of the running control signal, and others in a predetermined cycle.

In step S5, the driving control unit 212 of the vehicle 100 receives the running control signal transmitted from the remote control device 300. In step S6, the driving control unit 212 controls the actuator group 140 of the vehicle 100 using the received running control signal, thereby causing the vehicle 100 to run at the acceleration and the steering angle indicated by the running control signal. The driving control unit 212 repeats the reception of a running control signal and the control over the actuator group 140 in a predetermined cycle. According to the conveyance system 600 in the present embodiment, it becomes possible to move the vehicle 100 without using a transport unit such as a crane or a conveyor.

Returning to FIG. 4, the progress status acquisition unit 318 acquires a progress status of processing performed on the vehicle 100 conveyed by the conveyance device 500. In the present embodiment, the progress status acquisition unit 318 acquires a progress status of an inspection process of the vehicle 100 performed in the range AR3 illustrated in FIG. 1. In the present embodiment, the progress status acquisition unit 318 acquires the conveyance position of the vehicle 100 and acquires the progress status of the inspection by using the acquired conveyance position. However, the progress status acquisition unit 318 may acquire the progress status of the inspection by using, instead of or in addition to the conveyance position of the vehicle 100, an elapsed time from the conveyance start time of the vehicle 100 by the conveyance device 500, detection of button operation for notifying an end of each inspection by an operator, or other factors.

As indicated by markers M1, M2, M3, Mn in FIG. 1, a plurality of markers are provided in the vicinity of the conveyance unit 510. Each marker is provided at a boundary of the conveyance section by the conveyance device 500 and is used for detecting the progress status of the inspection process. Specifically, at a boundary PT31 between the range AR2 and the range AR3, the marker M1 indicating the start of the inspection on the vehicle 100 is provided, and, at a boundary PT3n between the range AR3 and the range AR4, the marker Mn indicating the end of the inspection is provided.

When the inspection process includes a plurality of pieces of processing, the range AR3 may be finely divided into a plurality of ranges corresponding to the plurality of pieces of processing. In the present embodiment, the range AR3 includes, for example, a plurality of ranges respectively associated with progress statuses of the plurality of pieces of processing included in the inspection process. Specifically, the range AR3 includes the range AR31 corresponding to the engine room inspection and the range AR32 corresponding to the appearance inspection.

The marker M2 is provided at a boundary PT32 between the range AR31 and the range AR32, and the marker M3 is provided at a boundary PT33 between the range AR32 and the range subsequent to the range AR32. The progress status acquisition unit 318 can acquire the progress status of the inspection process by analyzing the vehicle information acquired from the vehicle detector 80 and checking the relative position of the vehicle 100 with respect to the markers M1, M2, M3, and Mn. The progress status acquisition unit 318 may acquire the progress status of the processing on the vehicle 100 by acquiring the conveyance position VP stored in the storage device 440 from the conveyance control device 400 instead of or in addition to the vehicle detector 80, and using the conveyance position VP. The progress status acquisition unit 318 may acquire the progress status of the processing on the vehicle 100 by acquiring the conveyance position of the vehicle 100 directly from the conveyance position detector 526.

The device determination unit 320 determines a device to be switched to any of the actuation state, the standby state, and the regulation state, among devices in the actuator group 140 that have been set to the standby state for inspection, by using the progress status acquired by the progress status acquisition unit 318. In present embodiment, the device determination unit 320 refers to the correspondence table TB stored in the storage device 340, and determines the device to be switched to any of the actuation state and the standby state according to the acquired progress status of the inspection process.

The "actuation state" is a device state to which a device is switched for enabling the vehicle to run by remote control. The actuation state is a device state for enabling the vehicle 100 to run, including not only power-on of the device but also a state where the transmission unit 162 is in the D-range, the non-fixation state of the lock unit 164, and the like, for example. The "standby state" means a device state to which the vehicle 100 is switched for performing an inspection of the vehicle 100. When the device of the vehicle 100 is switched to the standby state, the vehicle 100 is in a state of being not able to run by remote control or a state not appropriate for running of the vehicle 100. In the present embodiment, the standby state includes a power-off state. The "power-off state" is a state where the power of a device is off. Specifically, in the present embodiment, the power-off state is a state where the power of the actuator included in the actuator group 140 is off.

The standby state may include the regulation state. The "regulation state" is a state where power of the device is on, and at least some of functions for running of the vehicle 100 in the device is regulated. The regulation state is not included in the actuation state. The regulation state includes a state where the vehicle 100 cannot cause the vehicle 100 to run by remote control even when the device is in the power-on state or a state not appropriate for running of the vehicle 100, such as a state where the transmission unit 162 is in the P-range and the fixation state of the lock unit 164, for example. Transition of the actuation state and the standby state to each other is possible from any of the states. Specifically, transition of the actuation state, the power-off state, and the regulation state to each other is possible from any of the states. The remote control unit 312 generates a control command for switching the determined device to any of the actuation state, the power-off state, and the regulation state according to the determination by the device determination unit 320 and transmits the control command to the vehicle 100.

FIG. 5B is an explanatory diagram illustrating an example of the correspondence table TB. The arrow in the drawing is added for convenience to facilitate understanding of the technology. In the correspondence table TB, a correspondence relationship between the progress status of the processing on the vehicle 100 and the device to be switched to the actuation state, the power-off state, and the regulation state. The correspondence table TB can be set individually for each vehicle 100. Specifically, the correspondence table TB may be individually set according to a content of processing such as an inspection performed on the vehicle 100 during conveyance by the conveyance device 500, a so-called destination country to which the vehicle 100 is to be shipped, a vehicle type of the vehicle 100, a type of a device mounted in the vehicle 100, or the like. In the present embodiment, the correspondence table TB is associated with each piece of vehicle identification information of the vehicle 100, and the device determination unit 320 selects the correspondence table TB corresponding to the acquired vehicle identification information.

In the upper stage of FIG. 5B, processes included in the inspection process is indicated. It is preferable that the start timing at which the device is switched to each state be determined in consideration of the time required for completion of switching to the actuation state in each process included in the inspection process. It is preferable that switching of the vehicle communication device 190 and the ECU 200 to the actuation state illustrated in FIG. 5B be completed by the start of the appearance inspection that is the subsequent process. In the present embodiment, the switching of the vehicle communication device 190 and the ECU 200 to the actuation state starts, for example, at the start time of the engine room inspection or during the progress of the engine room inspection. However, switching of the vehicle communication device 190, the ECU 200, and the remote control unit 312 to the actuation state may be completed by the start time of the engine room inspection. For example, the vehicle communication device 190, the ECU 200, and the remote control unit 312 may not be switched to the standby state at the start time of the inspection and the state may remain the actuation state. In the correspondence table TB illustrated in FIG. 5B, for convenience of understanding of the technology, states of each device between the inspection start time and the inspection completion time. Until the start time or the completion time of the inspection, switching to the standby state or the actuation state is completed at any timing.

Figure 6:
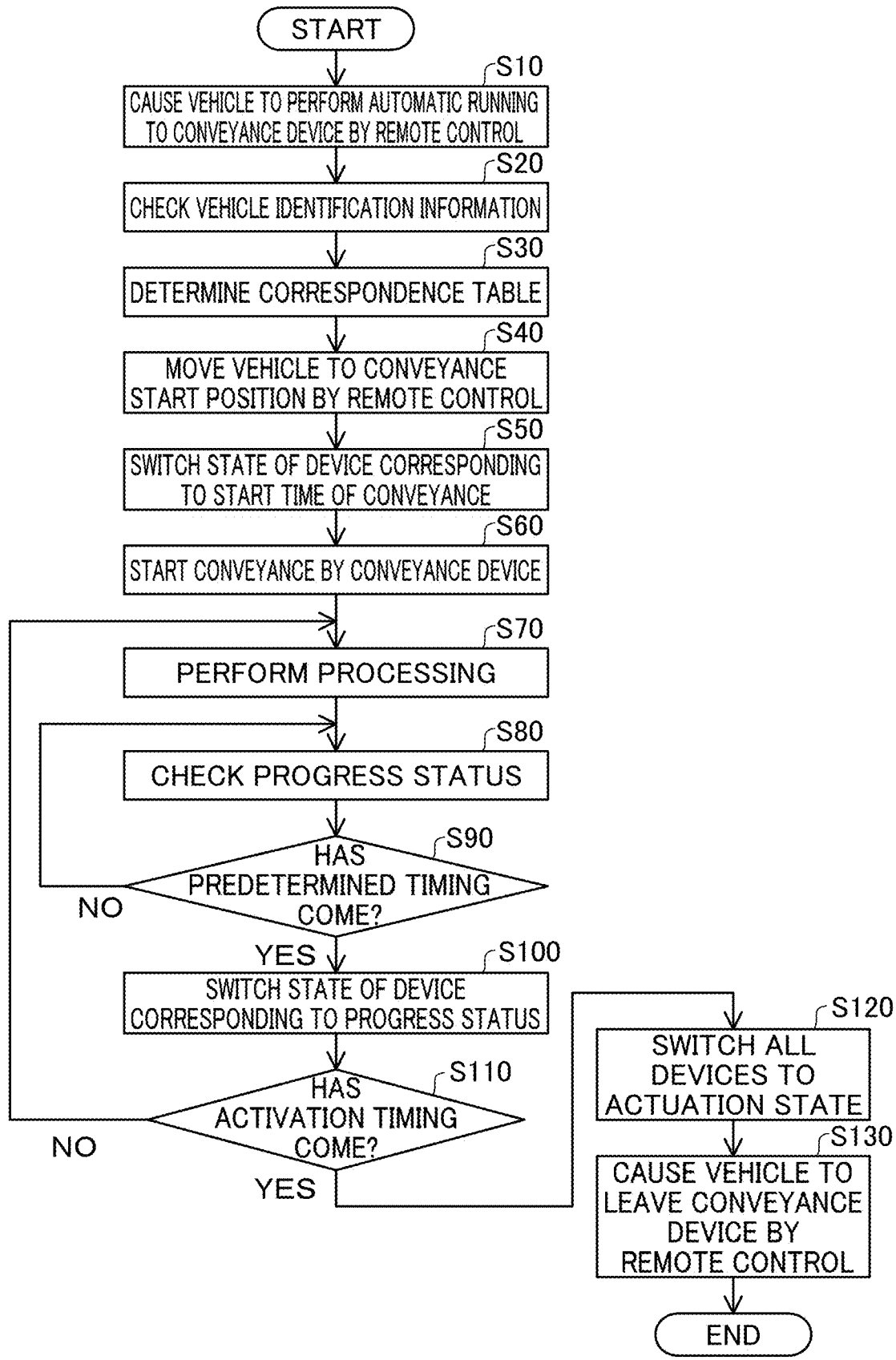
FIG. 6 is a flowchart illustrating a conveyance method of a vehicle according to the first embodiment.

FIG. 6 is a flowchart illustrating a conveyance method of the vehicle 100 according to the first embodiment of the present disclosure. This flow starts when the vehicle 100 starts running toward the conveyance device 500. Hereinafter, in order to facilitate understanding of the technology, description will be made with reference to FIGS. 1 and 5B as appropriate.

In step S10, the remote control unit 312 causes the vehicle 100 to perform automatic running toward the conveyance device 500 by remote control. Specifically, as indicated by the range AR1 of FIG. 1, the remote control unit 312 generates a control command for remote control by using the position and orientation of the vehicle 100p estimated by the position estimation unit 314 and transmits the control command to the vehicle 100p.

In step S20, the vehicle information acquisition unit 322 acquires vehicle identification information from the vehicle 100p that has reached the conveyance device 500 before the start of conveyance by the conveyance device 500 and checks whether the vehicle identification information matches the vehicle identification information of the conveyance target in production management. However, this checking may not be performed, and, when the vehicle identification information is not used, the vehicle information acquisition unit 322 may not be provided. In step S30, the device determination unit 320 determines a correspondence table TB corresponding to the acquired vehicle identification information among correspondence tables TB stored in the storage device 340.

In step S40, the remote control unit 312 causes the vehicle 100 to perform automatic running by remote control and move to a conveyance start position on the conveyance unit 510. In the example of FIG. 1, when the vehicle 100p reaches the conveyance device 500, the remote control unit 312 causes the vehicle 100p to runs over the start point SP of the conveyance unit 510 and move to the range AR2 by remote control using the vehicle information acquired from the vehicle detector 80p.

In step S50, the state of a device corresponding to the start time of processing performed in the conveyance, that is, a device corresponding to the start time of the inspection process is switched. As illustrated in FIG. 5B, at the start time of the inspection, power of all devices included in the vehicle 100 is turned off by the remote control unit 312, and all devices are switched to the standby state. As indicated as the vehicle 100q in FIG. 1, when the vehicle 100q reaches the conveyance start position, the device determination unit 320 determines, as the device to be switched to the standby state, the entire actuator group 140 of the vehicle 100. The remote control unit 312 generates a control command of turning power of all devices of the vehicle 100 off and transmits the control command to the vehicle 100. In step S60, the conveyance control device 400 controls the motor 522 to drive the conveyance unit 510 and starts the conveyance of the vehicle 100. In the present embodiment, the conveyance unit 510 is continuously driven, and S60 is performed in parallel to S50, and the like.

In step S70, an inspection on the vehicle 100 is performed. In the present embodiment, a plurality of inspections are performed on the vehicle 100. In the example of FIG. 1, the engine room inspection is performed on the vehicle 100 that has reached the range AR31. In step S80, the progress status acquisition unit 318 checks the progress status of the engine room inspection. The progress status acquisition unit 318 acquires the conveyance position of the vehicle 100, and acquires the progress status of the engine room inspection by using the acquired conveyance position.

In step S90, the device determination unit 320 checks whether the progress status of the engine room inspection has reached a predetermined timing. When the progress status of the processing has not reached the predetermined timing (S90: NO), the device determination unit 320 returns the process to step S80 and waits until the progress status reached the timing. When the progress status reaches the timing (S90: YES), the device determination unit 320 turns the process to step S100. In step S100, the state of the device corresponding to the progress status of the engine room inspection is switched.

As illustrated in FIG. 1, the device determination unit 320 determines a device whose state is changed at a predetermined timing in a period of time from a point at which the vehicle 100q reaches the range AR2 to a point at which the vehicle 100q reaches the range AR32. For example, the predetermined timing is set to a timing at which the vehicle 100 reaches the marker M1. When the progress status acquisition unit 318 detects that the vehicle 100 reaches the marker M1, the device determination unit 320 determines the vehicle communication device 190 and the ECU 200 as the devices to be switched to the actuation state according to the correspondence table TB illustrated in FIG. 5B. The remote control unit 312 generates a control command for causing the vehicle communication device 190 and the ECU 200 to make a transition to the actuation state, specifically, a control command of turning power of the vehicle communication device 190 and the ECU 200 on, and transmits the control command to the vehicle 100. With such a configuration, the motor for running 168 is in the actuation state at the time of the engine room inspection, and reduction in productivity of the engine room inspection can be suppressed or prevented.

In step S110, the device determination unit 320 checks whether a activation timing has come. The "activation timing" means a timing at which the vehicle 100 being conveyed by the conveyance device 500 is switched to a state in which running is enabled. At the activation timing, all devices that have been set to the standby state at the start time of the inspection among the devices of the vehicle 100 are determined as the devices to be switched to the actuation state. The activation timing is set by using a completion timing at which all the processing of the inspection process is completed. It is preferable that the activation timing be set with a timing before the completion timing in order to complete activation of all devices of the vehicle 100 before the completion timing. When the activation timing has not come (S110: NO), the device determination unit 320 returns the process to step S70 and the inspection process continues.

In the example of FIG. 1, when the vehicle 100 reaches the range AR32, the appearance inspection starts. As illustrated in FIG. 5B, when the progress status of the appearance inspection reaches a predetermined timing, the motor for running 168 is switched to the actuation state. The transmission unit 162, the EPB 167, the gas pedal 161, and the steering wheel 172 are switched to the regulation state. In the example of FIG. 1, the predetermined timing is a predetermined timing in a period of time from a point at which the vehicle 100 reaches the range AR31 to a point at which the vehicle 100 reaches the range next to the range AR32. Specifically, the predetermined timing is set to the timing at which the vehicle 100 reaches the marker M2.

When the conveyance position of the vehicle 100 reaches the position of the marker M2, the device determination unit 320 determines the motor for running 168 as the device to be switched to the actuation state, and determines the transmission unit 162, the EPB 167, the gas pedal 161, and the steering wheel 172 as the device to be switched to the regulation state, according to the correspondence table TB. The remote control unit 312 generates the control command of turning power of the motor for running 168 on in order to set the motor for running 168 to the actuation state. The remote control unit 312 turns the power of the transmission unit 162 on to set the transmission unit 162 to the state of the P range, turns the power of the EPB 167 on to set the EPB 167 to the stop state, and turns the power of the gas pedal 161 and the steering wheel 172 on, while transmitting a control command of fixing a control value so that the state is switched to a state in which operation is disabled, in order to set to the regulation state.

When the activation timing has come (S110: YES), the device determination unit 320 turns the processing to step S120. In step S120, the device determination unit 320 switches all the devices to the actuation state. As illustrated in FIG. 5B, by the completion timing at which all processing of the inspection process is completed, all the devices are switched to the actuation state. In the example of FIG. 1, the progress status acquisition unit 318 acquires reaching of the activation timing by using a marker, such as the marker M3, arranged before the marker Mn indicating the completion timing. The device determination unit 320 determines all devices as the devices to be switched to the actuation state by using the acquired activation timing. The "all devices" herein may not include a device that has already been in the actuation state. The remote control unit 312 generates a control command of setting all devices to the actuation state and transmits the control command to the vehicle 100. In step S130, the remote control unit 312 causes the vehicle 100s to leave the conveyance unit 510 by remote control and this flow ends. The vehicle 100t that has left the conveyance device 500 is dispensed to the next process by automatic running.

As described above, the remote control device 300 of the present embodiment includes: the remote control unit 312 that generates a control command for actuating the actuator group 140 provided in the vehicle 100 by remote control and transmits the control command to the vehicle 100; a progress status acquisition unit 318 that acquires the progress status of the inspection process of the vehicle 100; and a device determination unit 320 that determines a device to be switched to the actuation state for moving the vehicle 100 by remote control, among devices that have been set to the standby state before the inspection process, by using the acquired progress status. The remote control unit 312 generates a control command for switching the determined device to the actuation state and transmits the control command to the vehicle 100. According to the remote control device 300 of the present embodiment, since devices are sequentially switched to the actuation state on the basis of the progress status of the inspection process, as compared to a case where all devices are switched to the actuation state at the time of the completion of the inspection process, the delay in starting running of the vehicle 100 can be suppressed or prevented at the time of the completion of the inspection process. According to the remote control device 300 of the present embodiment, devices can be switched to the actuation state in an appropriate order according to the progress status of the inspection process.

According to the remote control device 300 of the present embodiment, the progress status acquisition unit 318 acquires, as the progress status, a predetermined activation timing before the completion timing at which all processing of the inspection process is completed. The device determination unit 320 determines, as the devices to be switched to the actuation state", all devices that has been set to the standby state among the plurality of devices by using the acquired activation timing. Therefore, all devices can be set to the actuation state before the timing at which all processing of the inspection process is completed. The vehicle 100 can run by remote control by the completion of the inspection process, and reduction in productivity in the inspection process and the conveyance by the conveyance device 500 is prevented.

According to the remote control device 300 of the present embodiment, the processing such as the inspection process is performed during the conveyance of the vehicle 100 by the conveyance device 500 capable of conveying the vehicle 100. Processing such as the inspection process can be performed during the conveyance of the vehicle 100 by the conveyance device 500. Accordingly, even in a state where the vehicle 100 cannot run such as a state where power of each unit of the vehicle 100 is turned off, the conveyance and processing such as the inspection process can be performed in parallel.

According to the remote control device 300 of the present embodiment, the progress status acquisition unit 318 acquires the conveyance position of the vehicle 100 associated with the progress status, and acquires the progress status by using the acquired conveyance position. Accordingly, by a simple method of acquiring the conveyance position of the vehicle 100, the progress status of the inspection process can be acquired.

According to the remote control device 300 of the present embodiment, a plurality of devices include the motor for running 168 that is the prime mover of the vehicle 100. The inspection process includes an inspection related to the motor for running 168 in a state where the power has been turned off as the standby state. The progress status acquisition unit 318 acquires, as the progress status, the completion timing at which the inspection related to the motor for running 168. The device determination unit 320 determines, as the device to be switched to the actuation state, the motor for running 168 by using the acquired completion timing of the inspection related to the motor for running 168. The remote control unit 312 generates a control command for switching the power of the prime mover to on and transmits the control command to the vehicle 100. Accordingly, by avoiding that the motor for running 168 become the actuation state at the time of the inspection related to the motor for running 168, the reduction in productivity of the inspection related to the motor for running 168 can be suppressed or prevented.

According to the remote control device 300 of the present embodiment, the standby state includes a regulation state that is a state where power of the device is on and at least some of functions for moving the vehicle 100 in the device are regulated. By switching the device to power-on before switching the device to the actuation state, switching to the actuation state can be made in a shorter time than in a case of switching from the standby state to the actuation state without going through the regulation state. Accordingly, it is possible to more reliably suppress or prevent the delay in starting running of the vehicle 100 by remote control at the completion of the inspection process.

B. Second Embodiment

Figure 7:
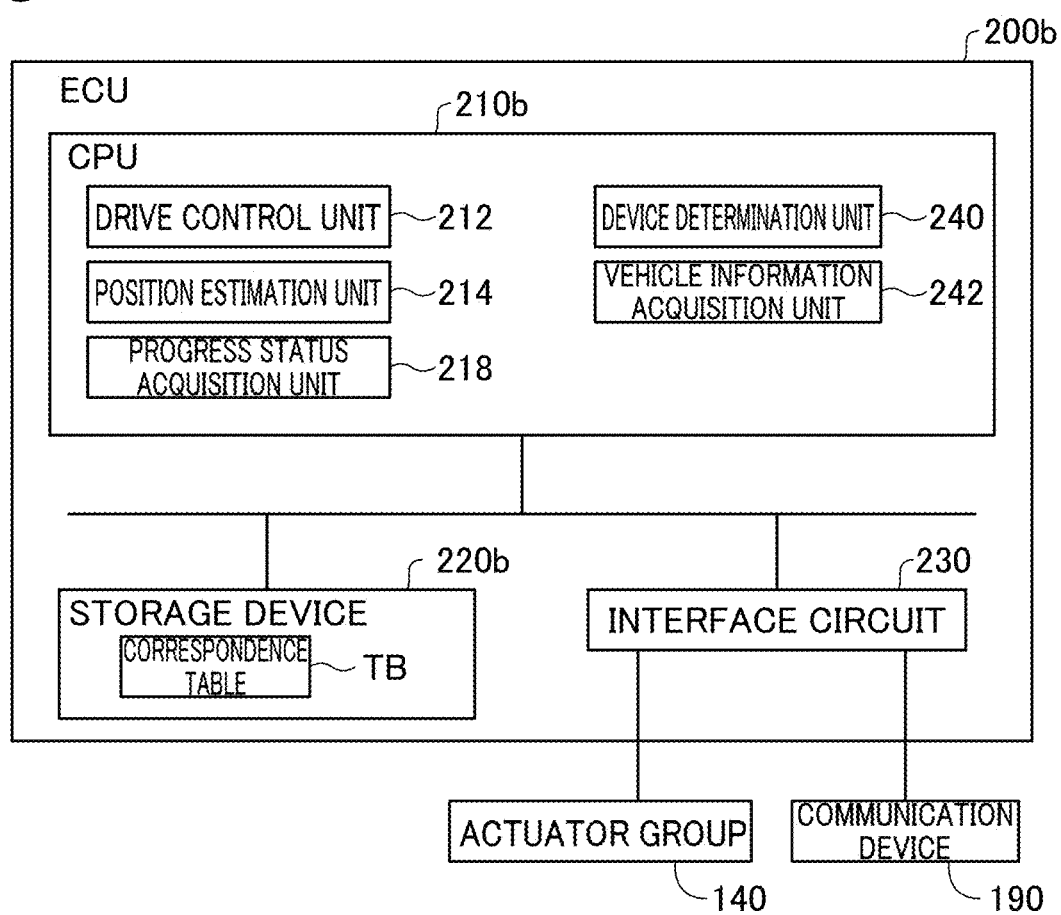
FIG. 7 is a block diagram illustrating a function configuration of an ECU of a vehicle according to a second embodiment.

FIG. 7 is a block diagram illustrating a functional configuration of an ECU 200b of the vehicle 100 according to a second embodiment. In the present embodiment, the conveyance system 600 is different from the first embodiment in not including the remote control device 300. Specifically, the conveyance system 600 of the present embodiment is different from the first embodiment in that the ECU 200b provided in the vehicle 100 has a function as a state switching device instead of the remote control device 300. Other configurations of the conveyance system 600 are the same as the first embodiment unless otherwise noted.

As illustrated in FIG. 7, the ECU 200b is different from the ECU 200 described in the first embodiment in that a CPU 210b is provided instead of the CPU 210 and a storage device 220b is provided instead of the storage device 220. Specifically, the storage device 220b stores a program for achieving, in addition to the function of the CPU 210 described in the first embodiment, functions corresponding to the position estimation unit 314, the progress status acquisition unit 318, the device determination unit 320, and the vehicle information acquisition unit 322 that the remote control device 300 described in the first embodiment has. As a result, the CPU 210b also functions as the position estimation unit 214, the progress status acquisition unit 218, the device determination unit 240, and the vehicle information acquisition unit 242 that correspond to the above functions. The storage device 220b stores the correspondence table TB stored in the remote control device 300. In the present embodiment, the device determination unit 240 functions as a command generation unit that generates a control command for switching the device determined by using the correspondence table TB to the actuation state or the regulation state and outputs the control command to the driving control unit 212. According to the vehicle 100 configured as described above, since the vehicle 100 has a function of a state switching device, devices can be sequentially switched to the actuation state on the basis of the progress status of the inspection process without using a separate device from the vehicle 100 such as the remote control device 300. As compared to a case where all devices are switched to the actuation state in one time at the time of the completion of the inspection process, the delay in starting running of the vehicle 100 can be suppressed or prevented with respect to the completion of processing.

Figure 8:
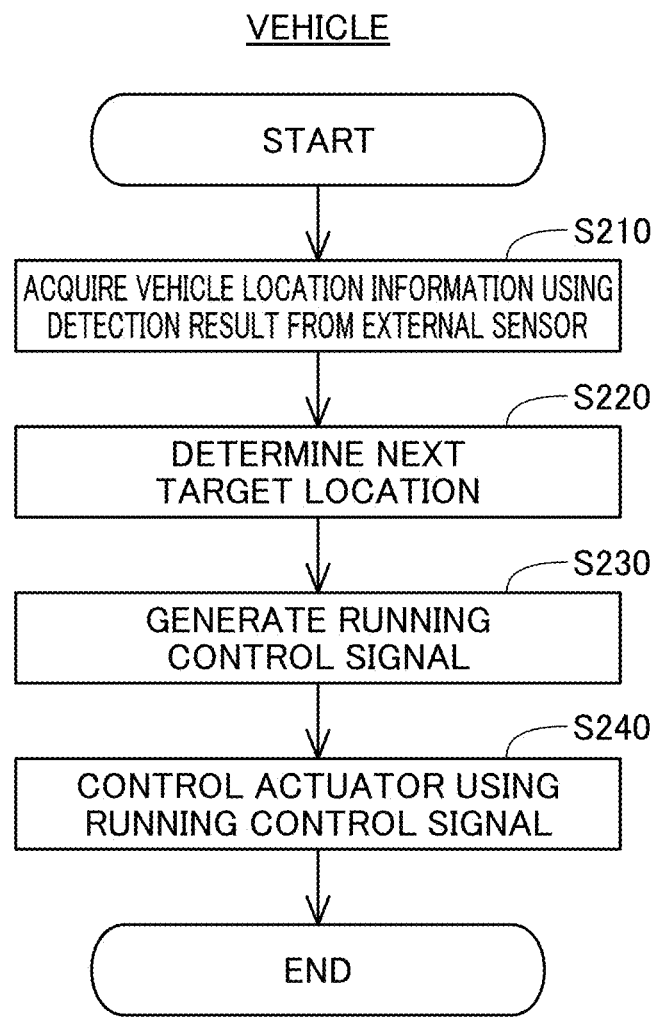
FIG. 8 is a flowchart illustrating a running method of the vehicle according to the second embodiment.

FIG. 8 is a flowchart showing a running method of the vehicle 100 of the second embodiment. In step S210, the position estimation unit 214 acquires vehicle location information using detection result output from external sensor. In step S220, the driving control determination unit 216 determines a target location to which the vehicle 100 is to move next. In step S230, the driving control determination unit 216 generates a running control signal for causing the vehicle 100 to run to the determined target location. In step S240, the driving control determination unit 216 controls the actuator group 140 using the generated running control signal, thereby causing the vehicle 100 to run by following a parameter indicated by the running control signal. The vehicle 100 repeats the acquisition of vehicle location information, the determination of a target location, the generation of a running control signal, and the control over the actuator group 140 in a predetermined cycle. According to the running control in the present embodiment, it is possible to cause the vehicle 100 to run by autonomous control without controlling the vehicle 100 remotely using the remote control device 300. More specifically, in the step S210, the position estimation unit 214 acquires the position and orientation of the vehicle 100 using the vehicle information output from the vehicle detector 80. Further, in the present embodiment, the reference route is stored in advance in the storage device 220*c* of the ECU 200*c*.

C. Other Embodiments (C1) In the above embodiments, the progress status acquisition unit 318 acquires, as the progress status, a predetermined activation timing before the completion timing at which all processing of the inspection process is completed, and all devices are switched to the actuation state at the activation timing. On the contrary, for example, instead of all devices, only a device for causing the vehicle 100 to run such as the drive device 160 may be switched to the actuation state. With such a configuration, it is possible to suppress the delay in running of at least the vehicle 100 with respect to the completion of the inspection process. However, it is preferable that devices other than the drive device 160 be switched to the actuation state.

(C2) In the above embodiments, an example in which the position estimation unit 314 and the position estimation unit 214 are provided is described. On the contrary, for example, in a case where highly accurate position information is not required in automatic running of the vehicle 100 or other cases, the position estimation unit 314 and the position estimation unit 214 may be omitted. In this case, for example, a detection result of a sensor capable of detecting the vehicle 100 such as the conveyance position detector 526 provided in the conveyance device 500 can be used.

(C3) Each of the embodiments described above shows an example in which the vehicle detector 80 is a LiDAR. By contrast, an external camera provided at a different location than the vehicle 100 can be used as the vehicle detector 80 instead of or together with LiDAR. In this case, the vehicle detector 80 acquires images of the vehicle 100 as the vehicle information. The position estimation unit 314 and the position estimation unit 214 can estimate the position of the vehicle 100 and the orientation of the vehicle 100 using captured images acquired by the external camera. In this case, in step S1 in FIG. 4A, the remote control device 300 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The remote control device 300 can acquire the orientation of the vehicle 100 through estimation based on the direction of a motion vector of the vehicle 100 detected from change in location of a feature point of the vehicle 100 between frames of the captured images using optical flow process, for example. The orientation of the vehicle 100 may also be calculated, for example, using the results of output of a yaw rate sensor or the like mounted on the vehicle 100.

The outer shape of the vehicle 100 in the captured image may be detected by inputting the captured image to a detection model using artificial intelligence, for example. The detection model is prepared in the conveyance system 600 or outside the conveyance system 600. The detection model is stored in advance in the storage device 340 of the remote control device 300, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label.

(C4) Each of the embodiments described above shows an example in which the vehicle 100 is a passenger car, truck, bus, construction vehicle, or the like. However, the vehicle 100 may be a variety of moving objects. In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

(C5) In each of the above-described embodiments, the vehicle 100 is simply required to have a configuration to become movable by unmanned driving. The vehicle 100 may embodied as a platform having the following configuration, for example. The vehicle 100 is simply required to include at least actuators and the ECU 200 as a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the vehicle communication device 190 further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(C6) The vehicle 100 may be produced by any production method. For example, the vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Mega-casting. Giga-casting can form each part conventionally formed by joining multiple parts in a moving object as a single component. The front module, the center module, or the rear module described above may be manufactured using Giga-casting, for example.

(C7) In the above-described first embodiment, the remote control device 300 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The remote control device 300 may acquire vehicle location information, determine a target location to which the vehicle 100 is to move next, and generate a route from a current location of the vehicle 100 indicated by the acquired vehicle location information to the target location. The remote control device 300 may generate a route to the target location between the current location and a destination or generate a route to the destination. The remote control device 300 may transmit the generated route to the vehicle 100. The vehicle 100 may generate a running control signal in such a manner as to cause the vehicle 100 to run along the route received from the remote control device 300 and control the actuator group 140 using the generated running control signal.

(2) The remote control device 300 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control the actuator group 140 using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the remote control device 300 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(C8) In the above-described embodiment in which the vehicle 100 can be running by autonomous control, the vehicle 100 may be equipped with an internal sensor, and detection result output from the internal sensor may be used in at least one of generation of a route and generation of a running control signal. For example, the vehicle 100 may acquire detection result from the internal sensor, and in generating the route, may reflect the detection result from the internal sensor in the route. The vehicle 100 may acquire detection result from the internal sensor, and in generating the running control signal, may reflect the detection result from the internal sensor in the running control signal.

(C9) In the second embodiment described above, the vehicle 100 acquires the position and orientation of the vehicle 100 using the detection result of the vehicle detector 80. By contrast, the vehicle 100 may be equipped with an internal sensor, the vehicle 100 may acquire vehicle location information using detection result from the internal sensor, determine a target location to which the vehicle 100 is to move next, generate a route from a current location of the vehicle 100 indicated by the acquired vehicle location information to the target location, generate a running control signal for running along the generated route, and control the actuator group 140 of the vehicle 100 using the generated running control signal. In this case, the vehicle 100 is capable of running without using any detection result from the vehicle detector 80. The vehicle 100 may acquire target arrival time or traffic congestion information from outside the vehicle 100 and reflect the target arrival time or traffic congestion information in at least one of the route and the running control signal. The functional configuration of the conveyance system 600 may be entirely provided at the vehicle 100. Specifically, the processes realized by the conveyance system 600 in the present disclosure may be realized by the vehicle 100 alone. Further, all of the structures of the conveyance system 600 and the functional structures of the remote control device 300 may be provided in the vehicle 100. In other words, the processes implemented by the conveyance system 600 and the remote control device 300 shown in the present disclosure, such as the process of switching at least one of the devices provided in the vehicle 100 from the standby state to the actuation state, may be implemented by the vehicle 100 alone.

(C10) In the above-described first embodiment, the remote control device 300 automatically generates a running control signal to be transmitted to the vehicle 100. By contrast, the remote control device 300 may generate a running control signal to be transmitted to the vehicle 100 in response to operation by an external operator existing outside the vehicle 100. For example, the external operator may operate an operating device including a display on which a captured image output from the vehicle detector 80 is displayed, steering, an accelerator pedal, and a brake pedal for operating the vehicle 100 remotely, and a communication device for making communication with the remote control device 300 through wire communication or wireless communication, for example, and the remote control device 300 may generate a running control signal responsive to the operation on the operating device.

(C11) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

(C12) Some or all of the functions of the conveyor control unit 412 and the conveyance position acquisition unit 414 achieved by the conveyance control device 400 described in the above first embodiment may be achieved by the remote control device 300, that is, the conveyance system 600 may be configured by the remote control device 300 itself.

(C13) In the above embodiments, an example in which the inspection process is performed during the conveyance by the conveyance device 500 is described. On the contrary, processing such as the inspection process may be performed in a period of time other than during the conveyance by the conveyance device 500. In this case, the progress status acquisition unit 318 or the progress status acquisition unit 218 acquires the progress status of the inspection process by using an elapsed time from the start of the inspection process or detection of button operation for outputting the end of each processing by an operator, for example. With such a configuration, it is also possible to suppress or prevent the delay in running of the vehicle 100 by remote control at the time of the completion of the inspection process.

(C14) In the above embodiments, an example in which the processing performed on the vehicle 100 is the inspection process is described. In addition, an example in which the inspection process includes the engine room inspection and the appearance inspection is described. On the contrary, the processing performed on the vehicle 100 may be a process other than the inspection process such as an assembly process. The inspection process may include other processing such as inspection and adjustment of lights and meters and an oil leakage inspection instead of or together with the engine room inspection and the appearance inspection.

(C15) In the above embodiments, an example in which the standby state includes the regulation state is described. On the contrary, the standby state may not include the regulation state, and the standby state may include only the power-off state, for example.

In each of the above-described embodiments, some or all of functions and processes realized by software may be realized by hardware. Furthermore, some or all of functions and processes realized by hardware may be realized by software. For example, any type of circuit such as an integrated circuit or a discrete circuit may be used as hardware for realizing the functions described in each of the foregoing embodiments.

The present disclosure is not limited to the embodiments described above and is able to be implemented with various configurations without departing from the spirit thereof. For example, the technical features of any of the embodiment, the examples and the modifications corresponding to the technical features of each of the aspects described in SUMMARY may be replaced or combined appropriately, in order to solve part or all of the problems described above or in order to achieve part or all of the advantageous effects described above. When the technical features are not described as essential features in the present specification, they are able to be deleted as necessary.

What is claimed is:

1. A state switching device comprising:
a progress status acquisition unit that acquires a progress status of processing performed on a moving object in a manufacturing process of the moving object in a factory for manufacturing the moving object movable by unmanned driving, the moving object including at least one device;
a device determination unit that determines a device to be switched to an actuation state, the determined device being included in the at least one device and being set to a standby state before the processing is performed, by using the acquired progress status; and
a command generation unit that generates a control command for switching the determined device to the actuation state and outputs the control command, wherein
the at least one device includes a prime mover of the moving object,
the processing includes an inspection related to the prime mover in a state of being stopped as the standby state,
the progress status acquisition unit acquires, as the progress status, a timing at which the inspection related to the prime mover is completed,
the device determination unit determines, as the device to be switched to the actuation state, the prime mover by using the acquired timing of the inspection related to the prime mover, and
the command generation unit generates a control command for actuating the prime mover and transmits the control command to the moving object.

2. The state switching device according to claim 1, wherein the progress status acquisition unit acquires, as the progress status, a predetermined activation timing before a completion timing at which all of the processing is completed, and
the device determination unit determines, as the device to be switched to the actuation state, each of all devices for moving the moving object among devices being set to the standby state before the processing is performed, by using the acquired activation timing.

3. The state switching device according to claim 1, wherein the processing is performed during conveyance of the moving object by a conveyance device capable of conveying the moving object.

4. The state switching device according to claim 3, wherein the progress status acquisition unit acquires a conveyance position of the moving object associated with the progress status and acquires the progress status by using the acquired conveyance position.

5. The state switching device according to claim 1, wherein the standby state includes a regulation state in which power of the device is on and at least some of functions for moving of the moving object in the device is regulated.

* * * * *